US008645968B2

(12) United States Patent
Nakagawa

(10) Patent No.: US 8,645,968 B2
(45) Date of Patent: Feb. 4, 2014

(54) INFORMATION PROCESSING SYSTEM, INFORMATION PROCESSING METHOD, PROGRAM, AND STORAGE MEDIUM

(75) Inventor: Isamu Nakagawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1368 days.

(21) Appl. No.: 11/682,061

(22) Filed: Mar. 5, 2007

(65) Prior Publication Data

US 2007/0234370 A1 Oct. 4, 2007

(30) Foreign Application Priority Data

Mar. 14, 2006 (JP) ................................. 2006-069899

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................................ 719/313

(58) Field of Classification Search
USPC ........................................................ 719/313
See application file for complete search history.

(56) References Cited

U.S. PATENT DOCUMENTS

| 5,937,148 A * | 8/1999 | Okazawa ...................... 358/1.13 |
| 2002/0045425 A1 * | 4/2002 | Takeda et al. .................... 455/41 |
| 2003/0204590 A1 | 10/2003 | Torii |
| 2004/0073824 A1 * | 4/2004 | Machida ........................ 713/323 |
| 2004/0146313 A1 * | 7/2004 | Uchizono et al. ................ 399/75 |
| 2005/0111865 A1 * | 5/2005 | Kubota ........................... 399/70 |

FOREIGN PATENT DOCUMENTS

| JP | 2002-287936 | 10/2002 |
| JP | 2003-323359 A | 11/2003 |
| WO | WO 2004099961 A1 * | 11/2004 ................ G06F 1/32 |

* cited by examiner

*Primary Examiner* — Hyung Sough
*Assistant Examiner* — Timothy A. Mudrick
(74) *Attorney, Agent, or Firm* — Cowan, Liebowitz & Latman, P.C.

(57) ABSTRACT

An information processing system capable of communicating with a printing apparatus which returns from power saving by external access, and having first and second access units adapted to access the printing apparatus, includes a requesting unit adapted to request notification of event occurrence generated by processing by the first access unit, and a determination unit adapted to determine the presence/absence of the notification of event occurrence. The second access unit accesses the printing apparatus, if the determination unit determines that there is the notification of the event occurrence.

14 Claims, 19 Drawing Sheets

FIG. 8B

```
      <NotifyEvent>
810 — <ComputerName>SalesPC-001</ComputerName>
820 — <UserName>Tanaka</UserName>
830 — <Device>DeviceA</Device>
840 — <JobStatus>BeforeJob</JobStatus>
      </NotifyEvent>
```

FIG. 9B

```
⎧        <RequestEventSubscribe>
⎪ 915 —— <ComputerName>ServerPC-001</ComputerName>
⎨ 916 —— <Address>10.168.16.1:8000
⎪ 917 —— <UserName>Admin</UserName>
⎪ 918 —— <JobStatus>AfterJob</JobStatus>
⎩        </RequestEventSubscribe>
```

FIG. 9C

```
⎧        <ResponseEventSubscribe>
⎨ 920 —— <SubscribeId>1001</SubscribeId>
⎩        </ResponseEventSubscribe>
```

FIG. 9D

```
⎧ <RequestEventUnsubscribe>
⎨ <SubscribeId>1001</SubscribeId>
⎩ </RequestEventUnsubscribe>
```

FIG. 9E

```
⎧ <RequestData>
⎨ <LatestJobLogNumber/>
⎩ </RequestData>
```

FIG. 9F

```
  ⎧       <ResponseData>
  ⎪ 925 — <LatestJobLogNumber>30
  ⎨       </LatestJobLogNumber>
  ⎪       </ResponseData>
  ⎩
```

FIG. 9G

```
  ⎧       <RequestData>
  ⎪       <JobLog>
  ⎪ 930 — <From>21</From>
  ⎨ 935 — <To>22</To>
  ⎪       </JobLog>
  ⎪       </RequestData>
  ⎩
```

FIG. 9H

```
  ⎧       <ResponseData>
  ⎪       <JobLog>
  ⎪ 940 — <Number>21</Number>
  ⎨ 945 — <DocumentName>StatusReport.txt</DocumentName>
  ⎪ 950 — <JobType>PDL</JobType>
  ⎪ 955 — <UserName>Tanaka</UserName>
  ⎪       </JobLog>
  ⎩       </ResponseData>
```

F I G. 11

| TAG NAME | CONTENTS | EXAMPLE |
|---|---|---|
| Number | LOG NUMBER WHICH INCREASES ONE BY ONE WHENEVER JOB LOG IS SAVED IN DEVICE | 21 |
| DocumentName | DOCUMENT NAME | StatusReport.xls |
| Pages | NUMBER OF LOGICAL PAGES | 9 |
| Sheets | NUMBER OF SHEETS | 3 |
| NUP | NUMBER OF PAGES ALLOCATED PER SIDE OF SHEET | 4 |
| StartTime | START TIME | 2001/12/20/ 21:11 |
| EndTime | END TIME | 2001/12/20/ 22:21 |
| SheetSize | SHEET SIZE | A4 |
| Plex | DOUBLE-SIDED OR SINGLE-SIDED | DOUBLE-SIDED |
| UserName | NAME OF USER WHO HAS PERFORMED PRINTING | Tanaka |
| SPoolDataSize | SPOOL DATA SIZE | 56789 |

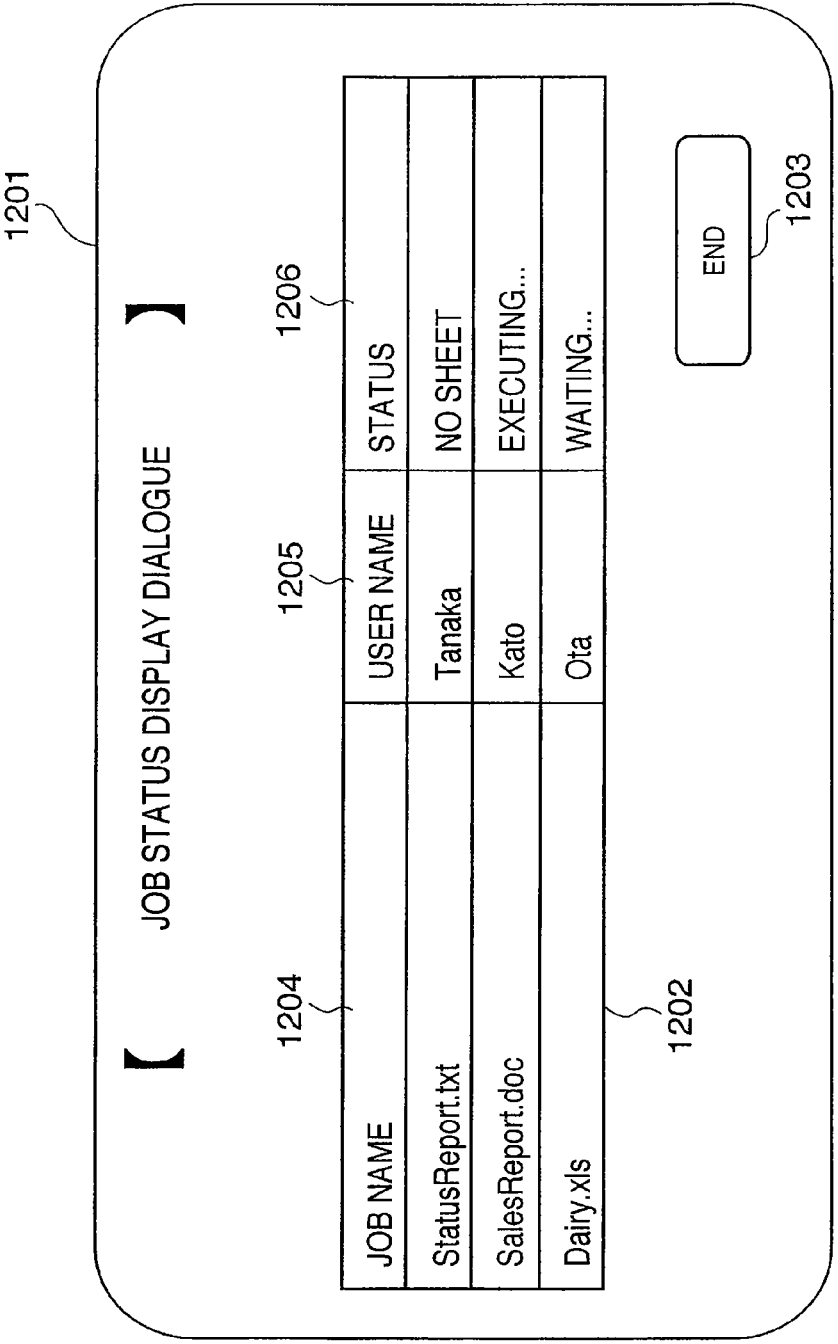

FIG. 13B

```
    ⎧           <RequestJobList>
    ⎪ 1320 ──── <JobStatus>ALL</JobStatus>
    ⎨ 1330 ──── <JobType>ALL</JobType>
    ⎪           </RequestJobList>
    ⎩
```

FIG. 13C

```
    ⎧              <ResponseJobList>
    ⎪  1335 ──── <Job1>
    ⎪              <JobId>1234</JobId>
    ⎪  1336 ──── <DocumentName>StatusReport.txt</DocumentName>
    ⎪  1337 ──── <UserName>Tanaka</UserName>
    ⎪  1338 ──── <Status>NO SHEET</Status>
    ⎪              </Job>
    ⎪
    ⎪  1340 ──── <Job2>
    ⎨              (CONTENTS OF SECOND JOB)
    ⎪
    ⎪              </Job>
    ⎪
    ⎪  1345 ──── <Job3>
    ⎪              (CONTENTS OF THIRD JOB)
    ⎪
    ⎪              </Job>
    ⎪              </ResponseJobList>
    ⎩
```

INFORMATION PROCESSING SYSTEM, INFORMATION PROCESSING METHOD, PROGRAM, AND STORAGE MEDIUM

BACKGROUND OF THE INVENTION

1. Field of the Invention

The present invention relates to an information processing system and an information processing method which, in a network environment, manages devices, such as a printer, a copying machine, and a multi-functional peripheral obtained by integrating the printer and copying machine, connected to a network.

2. Description of the Related Art

A polling technique is a general technique of monitoring the status of a device and acquiring some information from the device. When this polling technique is used, an application operating on a host computer periodically acquires status information from a device, changes the contents of display to the application user on the basis of the status information, and determines execution of the application itself.

When execution of the application is determined, the device executes an operation in response to a request from the application. For example, a device waiting in a power-saving mode (also called "sleep mode") proceeds to a state (normal operation mode) in which a normal operation is possible. The normal operation herein mentioned is an operation mode which operates an unit that exchanges various kinds of information (e.g., information including PDL and various kinds of status information) with an external apparatus.

Patent reference 1 (Japanese Patent Laid-Open No. 2002-287936) discloses an arrangement which uses a substitute means of a device to be processed if the device is in the sleep mode. However, if a device proceeds from the sleep mode to the normal operation mode by frequent access by an application, the device requires an elapse of a predetermined period to return to the sleep mode, examples of which are indicated in (1) and (2) below.

(1) There is no operation on an operation panel of the device for a predetermined period.

(2) There is no access to the device across a network for a predetermined period.

That is, frequent access by an application makes it impossible to obtain a satisfactory power-saving effect. If access to a device is totally restricted in order to change the status from the normal operation mode to the sleep mode, the user-friendliness decreases.

Also, the arrangement in patent reference 1 uses a device substitute means. In this case, it is necessary to determine whether a device to be processed is in the sleep mode, and this complicates the process in the system.

It is an object of the present invention to provide an information processing technique capable of suppressing the power consumption of a device by a simple process without decreasing the user-friendliness.

SUMMARY OF THE INVENTION

Embodiments of the present invention are provided to overcome the above-described drawbacks of the related technology.

According to an aspect of the present invention, an embodiment is directed to an information processing system capable of communicating with a printing apparatus which returns from power saving by external access, and having a first access unit and second access unit adapted to access the printing apparatus, comprising:

a requesting unit adapted to request notification of event occurrence generated by processing by the first access unit; and a determination unit adapted to determine the presence/absence of the notification of the event occurrence by the first access unit, wherein the second access unit accesses the printing apparatus, if the determination unit determines that there is the notification of the event occurrence.

According to another aspect of the present invention, an embodiment is directed to an information processing method in an information processing system capable of communicating with a printing apparatus which returns from power saving by external access, and having a first access unit and second access unit adapted to access the printing apparatus, comprising:

a requesting step of requesting notification of event occurrence generated by processing by the first access unit; and a determination step of determining the presence/absence of the notification of the event occurrence by the first access unit, wherein the second access unit accesses the printing apparatus, if it is determined in the determination step that there is the notification of the event occurrence.

The present invention can provide an information processing technique which increases the user-friendliness and suppresses the power consumption of a device without incorporating any complicated power-consumption-suppressing mechanism in the device.

Further features of the present invention will become apparent from the following description of exemplary embodiments (with reference to the attached drawings).

BRIEF DESCRIPTION OF THE DRAWINGS

FIG. 8B is a view showing an example of notification data;

FIG. 9B is a view showing an example of data indicating an event notification request;

FIG. 9C is a view showing an example of data returned from a device in response to the event notification request;

FIG. 9D is a view showing an example of event notification request cancellation data;

FIG. 9E is a view showing an example of request data for acquiring a latest log number;

FIG. 9F is a view showing an example of data returned from the device in response to the request for acquiring a latest log number;

FIG. 9G is a view showing an example of request data by which the application 109 acquires log data;

FIG. 9H is a view showing an example of data returned from the device in response to the log data acquisition request;

FIG. 11 is a view showing examples of the contents of data returned from the device in the first embodiment of the present invention;

FIG. 12 is a view showing the statuses of jobs executed by a device as a dialogue displayed on a CRT under the control of a CRT controller in the second embodiment of the present invention;

FIGS. 13A-1 and 13A-2 are flowcharts explaining the procedure of processing by an application 109 according to the second embodiment of the present invention;

FIG. 13B is a view showing an example of request data for acquiring a job list;

FIG. 13C is a view showing an example of data returned by the device in response to the request shown in FIG. 13B.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
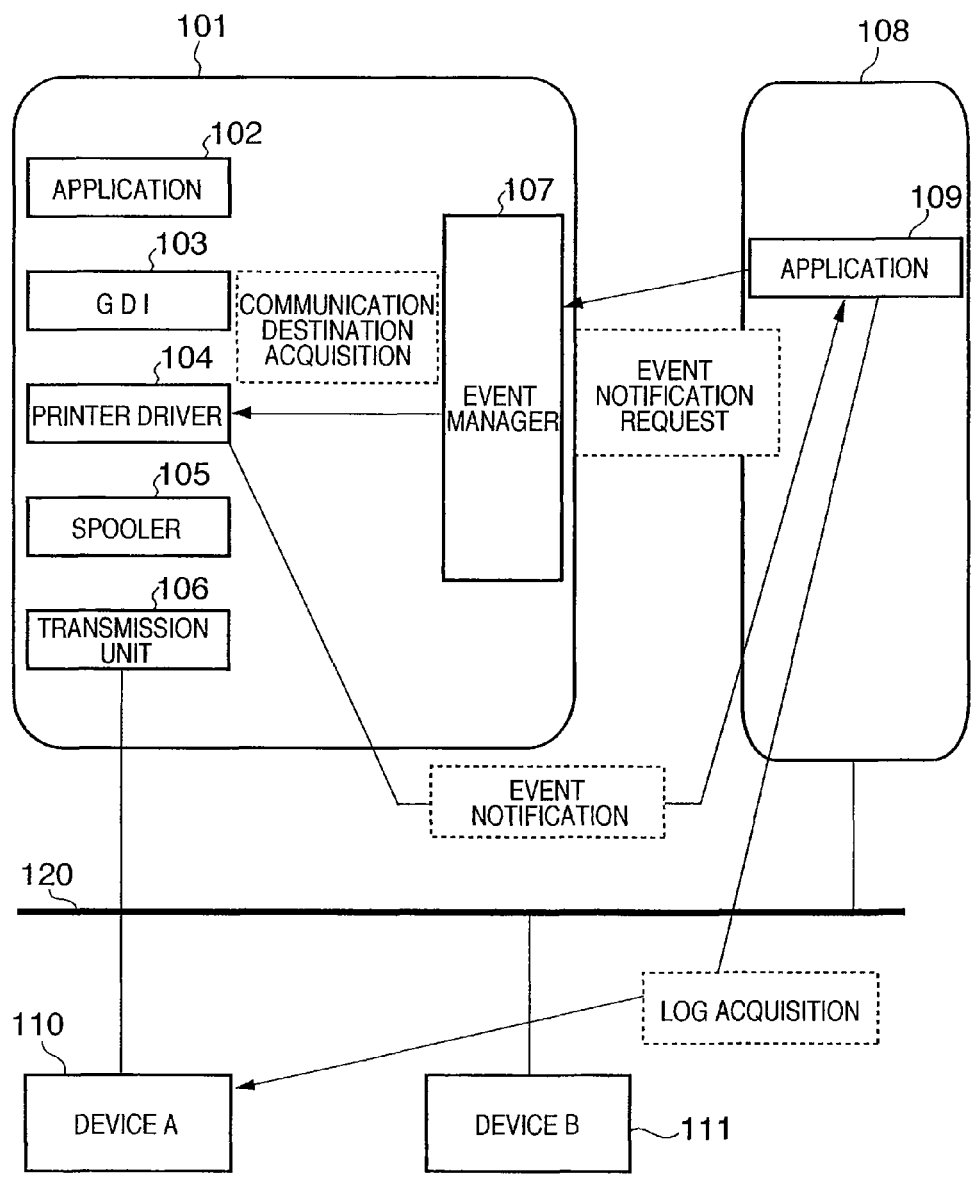
FIG. 1 is a block diagram showing an outline of the configuration of an information processing system according to an embodiment of the present invention.

An information processing system according to the first embodiment of the present invention will be explained below. FIG. 1 is a block diagram showing an outline of the configuration of the information processing system according to the embodiment of the present invention. When a program is supplied to each information processing apparatus forming the information processing system, the information processing apparatus functions as a means for implementing processing of the program (application).

Reference numeral 101 denotes an information processing apparatus (client computer); and 102, an application executable by the client computer 101. For example, the application 102 forms a document or image data to be printed, and instructs a device connected to a network 120 to print the document or data.

Reference numeral 103 denotes a graphic device interface (GDI) which accepts a print instruction from the application 102; and 104, a printer driver called by the GDI 103. When the application 102 issues a print instruction, the application 102 calls the GDI 103. The call of the GDI 103 is an abstract print instruction command independent of a printing device. The printer driver 104 converts the call from the GDI 103 into page description language (PDL) data interpretable by the device in accordance with the print settings.

Note that the converted data need not always be PDL data and need only be data interpretable by the device. The converted data is supplied to a spooler 105. The spooler 105 queues the supplied data, and sequentially supplies the data to a transmission unit 106. The transmission unit 106 receives the data from the spooler 105, and appropriately transmits the data to the device while determining whether the device can accept the data. An event manager 107 accepts an event notification request (a request for distributing notification of an event having occurred in the client computer 101 (this request is also called "an event notification request")) from each of various applications in another information processing apparatus (server computer 108). That is, the event manager 107 operates as a managing means for managing the notification destination of the occurrence of an event. More specifically, the event manager 107 stores an event notification destination (request source) on the basis of the accepted event notification request, and notifies the printer driver 104 of the event notification destination (request source). The printer driver 104 notifies the event notification destination (request source) notified by the event manager 107 of the occurrence of an event which accesses a device. An application 109 having received this event occurrence notification can start accessing a device A 110 or device B 111 (i.e., can start application processing).

Figure 14:
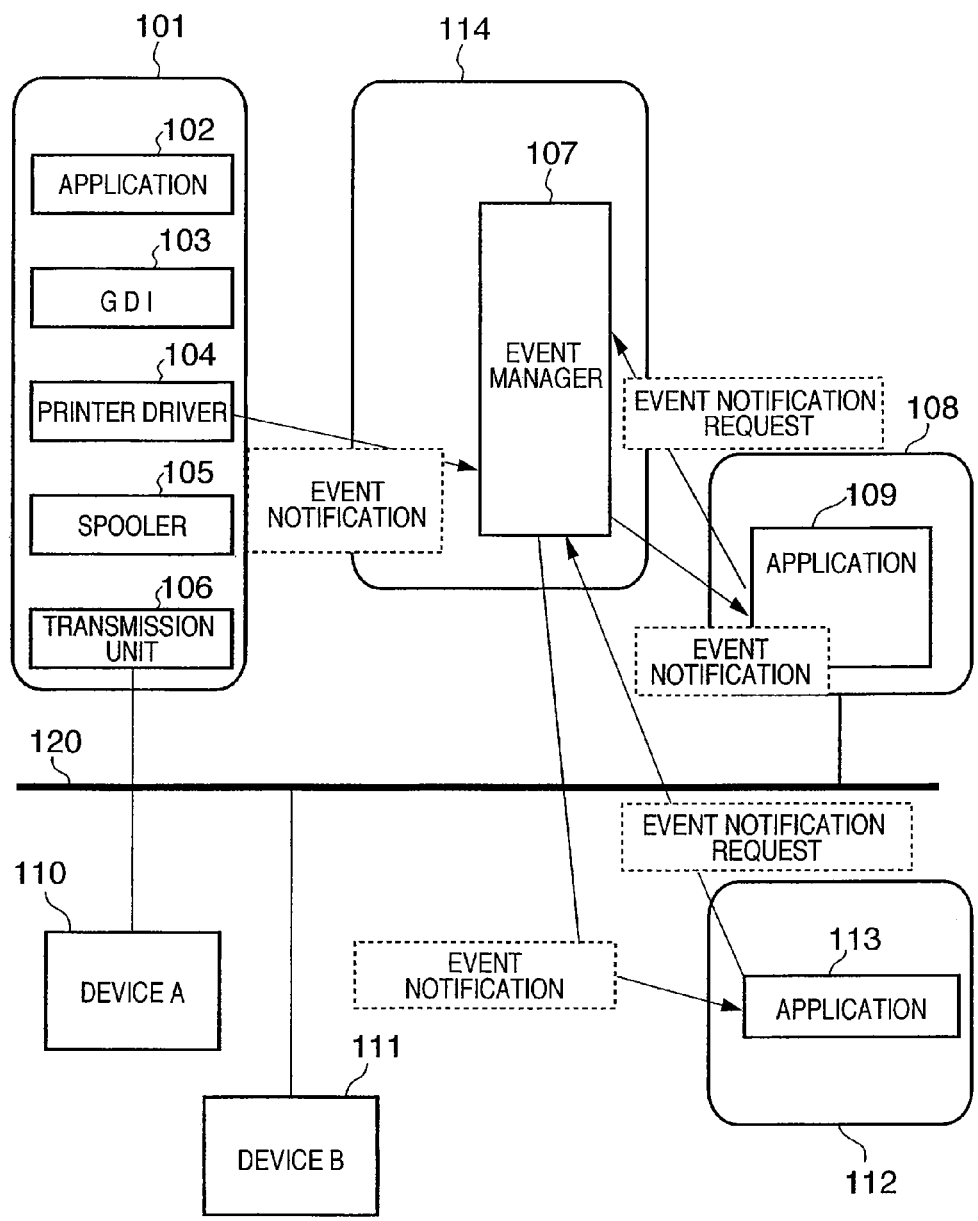
FIG. 14 is a block diagram showing an outline of the configuration of an information processing system according to an embodiment of the present invention.

Note that the event manager 107 is installed in the client computer 101 in FIG. 1, but the gist of the present invention is not limited to this configuration. For example, as shown in FIG. 14, the event manager 107 may also be installed in a server computer 114 independent of the client computer 101. Note also that the present invention is not limited to the event occurrence notification from the printer driver 104 to the application 109. For example, in the configuration shown in FIG. 14, the application 109 of the server computer 108 issues an event notification request to the event manager 107, and the event manager 107 notifies the printer driver 104 of an event notification destination (request source). When accessing a device, the printer driver 104 can notify the event manager 107 connected to the server computer of the occurrence of the event, instead of the event notification destination (request source). The event manager 107 having received this notification can notify the event notification destination (request source) of the occurrence of the event. The application 109 having received this event occurrence notification can start accessing the device A 110 or device B 111 (i.e., can start application processing).

In the configuration shown in FIG. 14, if an application 113 of a server computer 112 has also issued an event notification request to the event manager 107, the event manager 107 can distribute event occurrence notification to a plurality of request sources. Each application 109 or 113 having received this event occurrence notification can start accessing the device A 110 or device B 111 (i.e., can start application processing).

In the configuration shown in FIG. 1 or 14, the access (application processing) from the application 109 or 113 to the device is prohibited until the event occurrence notification is received. The power consumption of the device can be suppressed by controlling the timing of access from another application to the device in synchronism with the occurrence of an event (e.g., execution of printing by the printer driver) which causes the device to proceed from a sleep mode to a normal operation mode.

In this embodiment, an access unit adapted to perform a process of accessing a device can be roughly classified into two categories. The first one is an access unit having a high access priority to a device in view of software functions and properties. Printer driver software is an example of the first access unit. The printer driver is software which allows a printer device to print generated print data. The printer driver often requires access to the printer device even if the device is in a power-saving state. The printer driver 104 shown in FIGS. 1 and 14 is the first access unit. Another example of the access unit having a high access priority to a printer device is an application which downloads form data.

The second one is an access unit having a relatively low access priority to a printer device in view of software functions and properties. "Low" herein mentioned unit that the access priority to a device is lower than that of the first access unit described above. Log collection software which collects the operation logs of a printer device is an example of the second access unit. In the first place, the operation log of a printer device likely remains unchanged if the device has proceeded to the power-saving state. Therefore, it is not always necessary to access a printer if the printer has proceeded to the power-saving state. The applications 109 and 113 shown in FIGS. 1 and 14 are the second access unit. Another example of the access unit having a relatively low access priority to a printer device is an application which monitors and notifies the status of a job.

In the following explanation, the printer driver 104 is the first-category access unit, and the applications 109 and 113 are the second-category access unit. However, neither access unit is limited to any specific application for a printer or the like.

The explanation will return to FIG. 1. The application 109 is installed in the server computer 108. The application 109 can suitably communicate with a device on the network 120 to acquire information of the device across the network 120, thereby providing various services to the user.

The device A 110 and the device B 111 are connected to the network 120, and can print PDL data and the like transmitted from the client computer 101. As a device function, the device A 110 and the device B 111 may also have a copying function, FAX function, or the like in addition to the printing function. Each device may also be configured as a multi-functional peripheral having all these functions.

Figure 2:
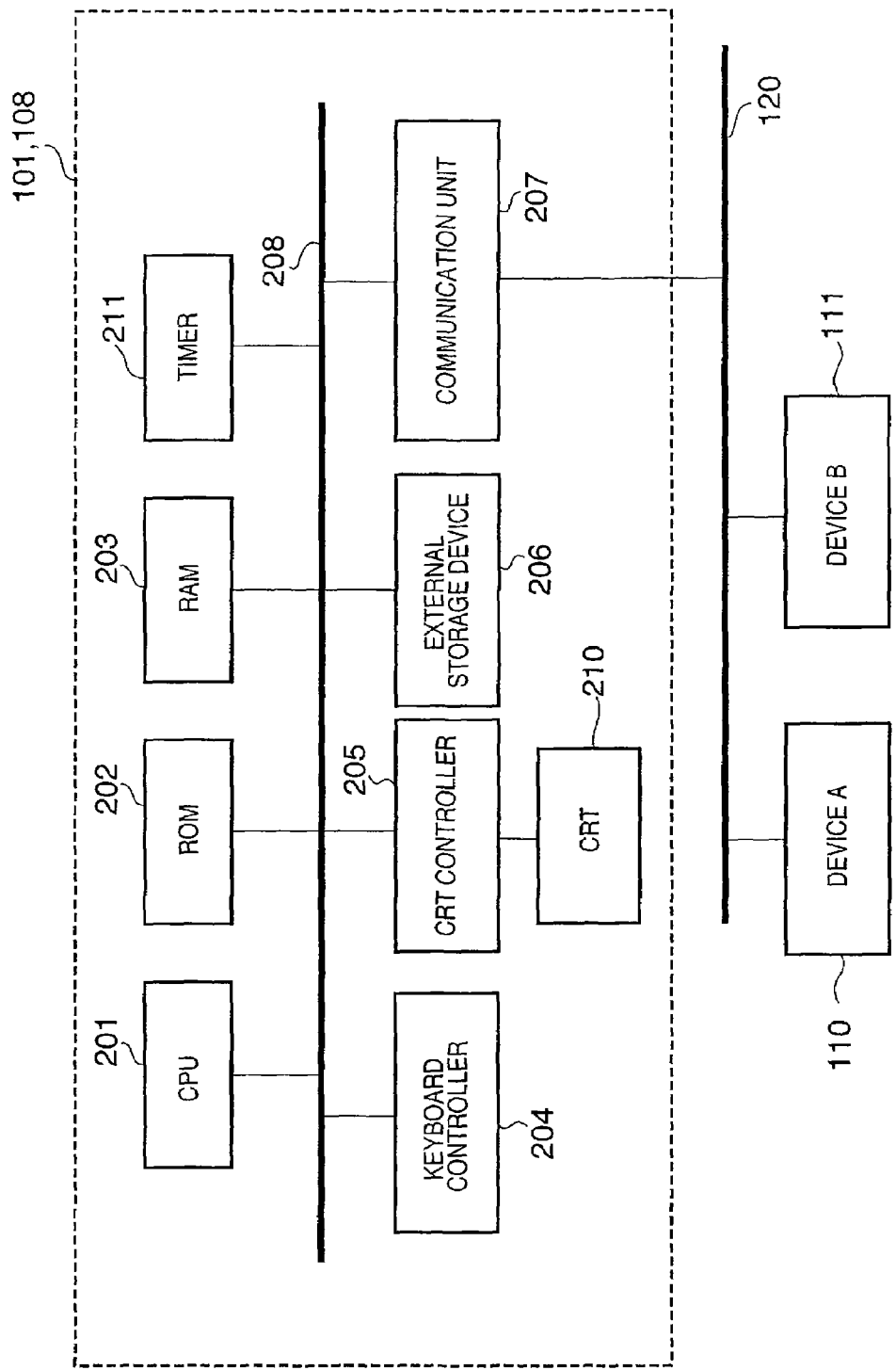
FIG. 2 is a block diagram showing the arrangement of a client computer 101 and server computer 108 according to the embodiment of the present invention.

FIG. 2 is a block diagram showing the arrangement of the client computer 101 and server computer 108. Referring to FIG. 2, a central processing unit (CPU) 201 controls the whole computer and performs arithmetic processing and the like. A read-only memory (ROM) 202 functions as a storage area for information of a system start-up program and the like. A random access memory (RAM) 203 functions as a data storage area having no limitations on use. Also, programs such as an operating system, application, device driver, and communication control program are loaded into the RAM 203. In this case, the RAM 203 functions as an execution area of the loaded programs.

A keyboard controller (KBC) 204 receives input data from a keyboard and transfers the data to the CPU. A display controller (CRT controller) 205 controls the display of a display device (CRT) 210. An external storage device 206 is, e.g., a flexible disk (FD) device, hard disk (HD) device, or nonvolatile storage device (SRAM). Programs and data are stored in the external storage device 206, and referred to or loaded into the RAM 203 where necessary when they are executed. A communication unit 207 controls network communication. The computer can communicate with other computers and the device A 110 and the device B 111 connected to the network 120 shown in FIG. 1 via the communication unit 207. A system bus 208 connects the individual components described above, so these components can exchange data with each other via the system bus 208.

A timer 211 measures the current time. On the basis of the measurement result from the timer 211, the CPU 201 can control the execution timing of an application.

Figure 3:
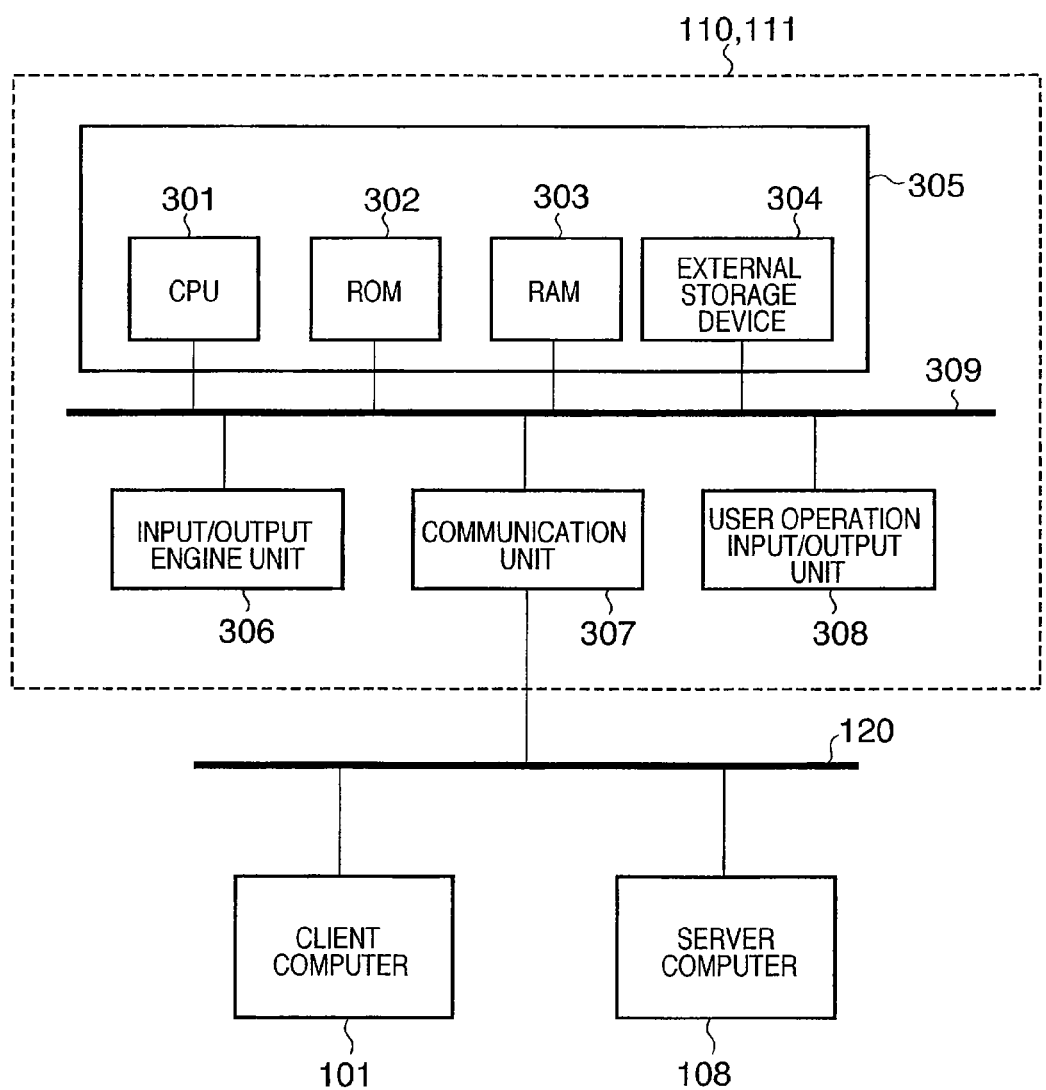
FIG. 3 is a block diagram showing the arrangement of a device A 110 and device B 111 according to the embodiment of the present invention.

FIG. 3 is a block diagram showing the arrangement of the device A 110 and device B 111. Referring to FIG. 3, a controller 305 controls the whole device. In the internal configuration of the controller 305, a central processing unit (CPU) 301 controls the controller 305 and performs arithmetic processing and the like. A ROM 302 functions as a storage area for information of a system start-up program and the like. A RAM 303 is a data storage area having no limitations on use. Programs such as an operating system, communication control program, and engine control program are loaded into the RAM 303, and the RAM 303 functions as an execution area of the loaded programs. A nonvolatile storage device (external storage device) 304 is a hard disk (HD), SRAM, or the like.

An input/output engine unit 306 of the device A 110 or device B 111 executes a printing operation, image reading operation, and the like under the control of the controller 305. A communication unit 307 controls network communication. The device can communicate with the client computer 101 and server computer 108 connected to the network 120 shown in FIG. 1 via the communication unit 307. A user operation input/output unit 308 performs processing concerning input/output settings input from the user. A system bus 309 connects the individual components described above, so these components can exchange data with each other via the system bus 309.

Figure 4:
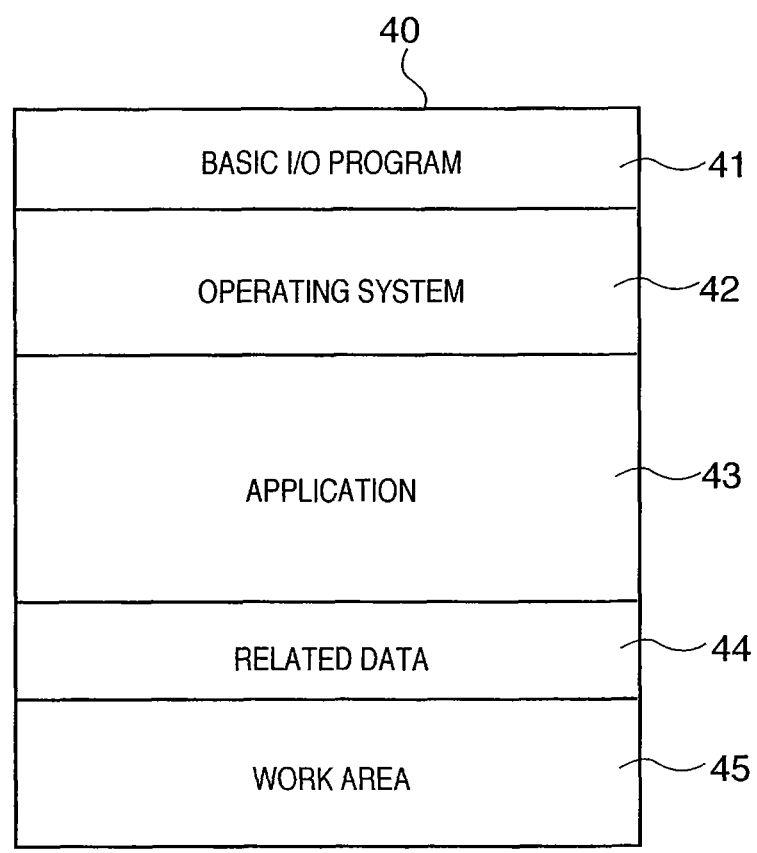
FIG. 4 is a view showing the configuration of a memory map when the client computer 101 executes processing.

FIG. 4 is a view showing an example of the configuration of a memory map 40 when the client computer 101 executes processing. Reference numeral 41 denotes a basic I/O program; 42, a memory map when an operating system such as the Windows system is loaded into the RAM 203 and becomes executable; 43, a memory map when a program according to the embodiment of the present invention is loaded into the RAM 203 and becomes executable; 44, a memory map when related data is loaded into the RAM 203 and becomes executable; and 45, a memory map of a work area to be used by each program.

Figure 5:
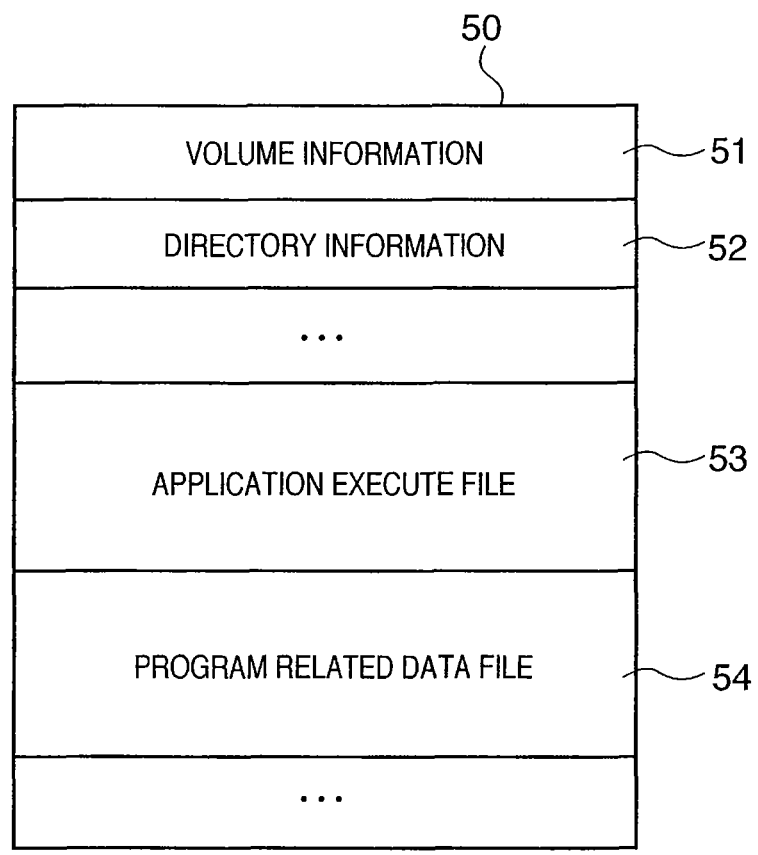
FIG. 5 is a view showing examples of the contents stored in a storage medium.

Programs and related data according to the embodiment of the present invention are recorded on a storage medium such as a flexible disk (FD). FIG. 5 is a view showing the contents stored in the storage medium. A storage area 50 of a flexible disk (FD) or the like stores, e.g., volume information 51, directory information 52, an application execute file 53, and a program related data file 54.

Figure 6:
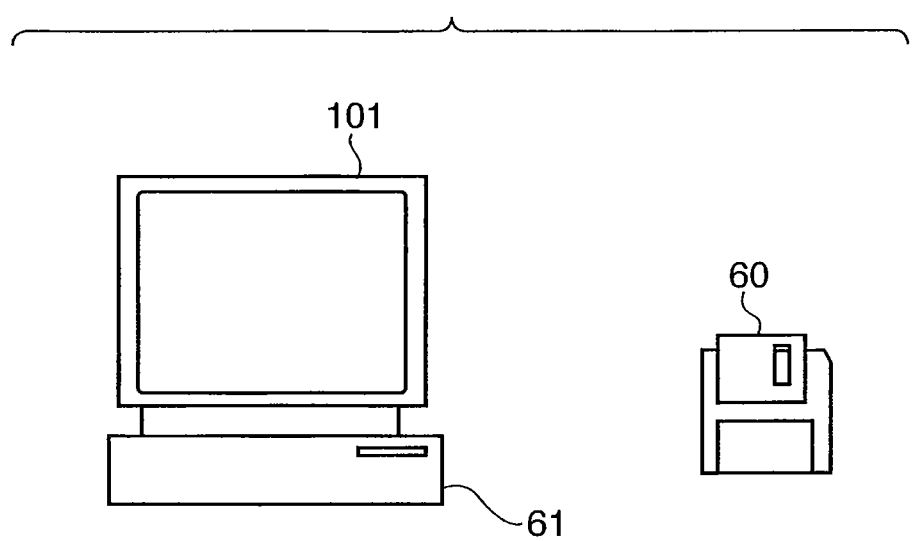
FIG. 6 is a view explaining loading of a program or the like stored in a flexible disk (FD)

As shown in FIG. 6, the programs, related data, and the like stored in a flexible disk (FD) 60 can be loaded into the client computer 101 or server computer 108 via an FD drive (DKC) 61. When the flexible disk (FD) 60 is set in the FD drive (DKC) 61, the program and related data 54 are read out from the flexible disk (FD) 60 under the control of the operating system 42 and basic I/O program 41. The program and related data 54 are loaded into the RAM 203 and made available.

(Processing by Printer Driver 104)

Figure 7:
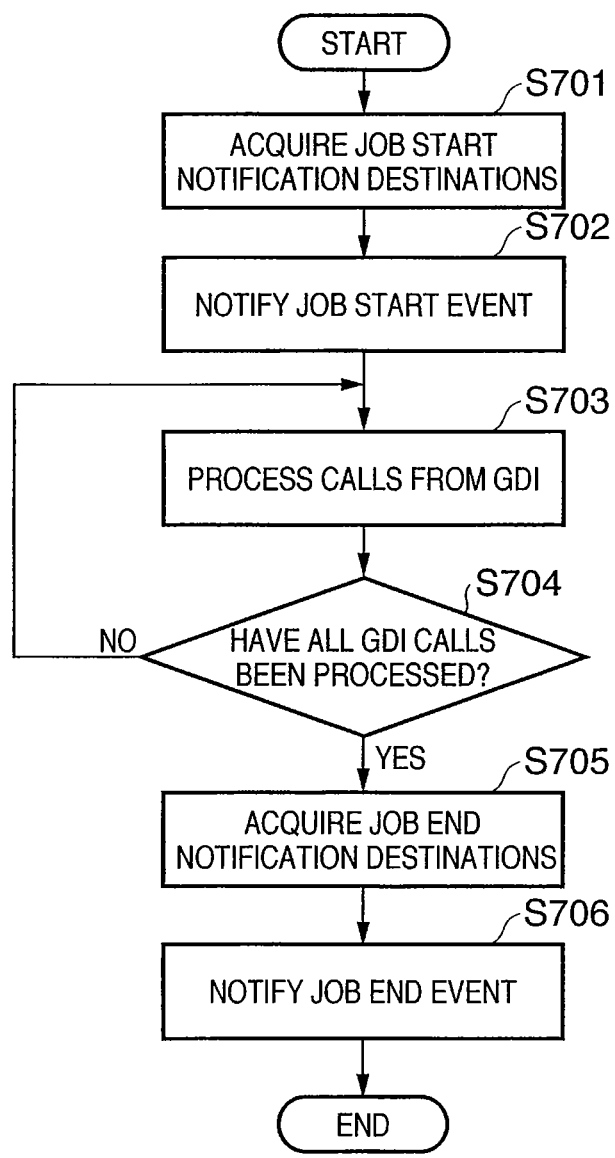
FIG. 7 is a flowchart explaining the procedure of processing by a printer driver 104 according to the first embodiment of the present invention.

The procedure of processing by the printer driver 104 installed in the client computer 101 will be explained below with reference to a flowchart shown in FIG. 7. This flowchart takes a case in which the application 102 executes printing as an example.

The flowchart indicates event notification added to the conventional processing performed by the printer driver.

In step S701, the printer driver 104 acquires one or a plurality of event notification destinations corresponding to the start of printer driver job processing from the event manager 107. For example, the event manager keeps the addresses (transmitted in step S902 and waited for in step S904 to be described later) of event notification destinations in a prescribed file. Therefore, the printer driver 104 performs the acquisition process in step S701 by reading out the addresses of the event notification destinations from the file. It is also possible to acquire the event notification destinations by communication between the event manager and process.

The term "event notification destination" is used in the above description. In FIG. 1, for example, the event notification destination is an application which operates by using the start or end of job transmission as a trigger. Examples of the application corresponding to the event notification destination are an application which monitors the status of a job and an application which collects job logs.

In step S702, the printer driver 104 performs a process of notifying a job start event as one event occurrence notification on the basis of the addresses acquired in step S701. In step S703, the printer driver 104 processes a call from the GDI 103. For example, an application which monitors the status of a job presumably starts the status monitoring process by using a job start event as a trigger. A job start event is used for an application like this.

In step S704, the printer driver 104 determines whether all GDI calls have been processed. If all calls have been processed (YES in S704), the printer driver 104 advances the process to step S705. If not all calls have been processed (NO in S704), the printer diver 104 returns the process to step S703, and repeats the processes in steps S703 and S704 until all GDI calls are completely processed.

In step S705, the printer driver 104 acquires job end event notification destinations from the event manager 107.

In step S706, the printer driver 104 performs a process of notifying an event indicating the end of the printer driver job processing, as one event occurrence notification, on the basis of the addresses acquired in step S701. For example, an application which collects job logs can start processing by using this notification as a trigger. This allows the job log collecting application to access a device at a properly delayed timing instead of an unnecessarily early timing. Also, a device status monitoring application or the like terminates access (e.g., polling) for acquiring the status of a device in response to this notification in step S706. This prevents unnecessary access to the device, and allows the device to proceed to the power-saving state early.

(Event Notification Process (S702 & S706))

Figure 8A:
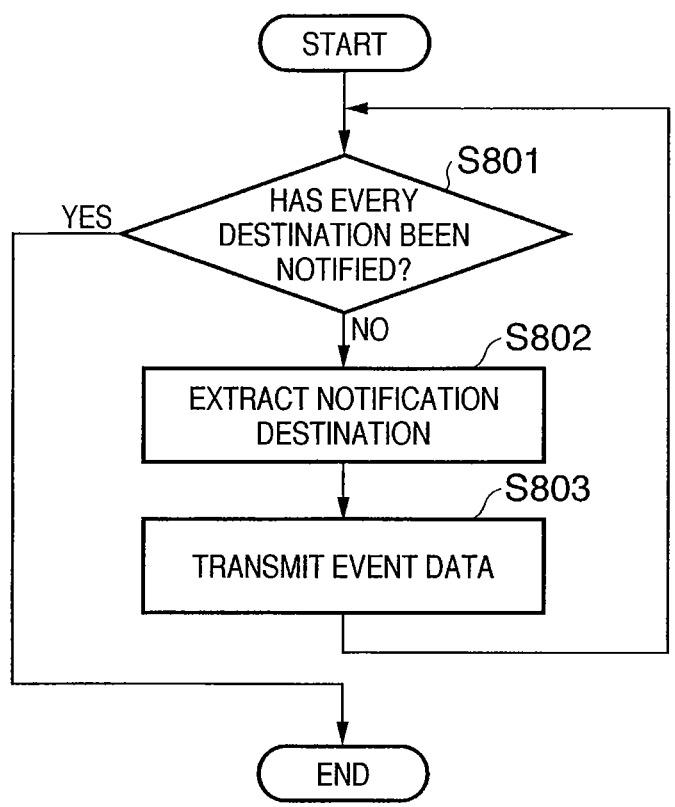
FIG. 8A is a flowchart explaining the procedure of an event notification process in each of steps S702 and S706 of FIG. 7.

The procedure of the event notification process in each of steps S702 and S706 described above will be explained below with reference to a flowchart shown in FIG. 8A.

Steps S801 to S803 indicate a process of notifying every notification destination of an event.

In step S801, the printer driver 104 determines whether every notification destination acquired from the event manager 107 has been notified of the event. If every notification destination has been notified of the event (YES in S801), the printer driver 104 terminates the process. If there is an unnotified notification destination (NO in S801), the printer driver 104 advances the process to step S802, and extracts one notification destination address.

In step S803, the printer driver 104 performs a notification process on the notification destination address extracted in step S802. This notification process is a process of connecting to a TCP/IP port and transmitting necessary data by a predetermined format to the address acquired in step S802. FIG. 8B shows an example of the notification data in step S803. In this example, the data is described by the XML (extensible Markup Language) format. A tag <ComputerName> 810 indicates the host name in TCP/IP of the computer in which the event has occurred. A tag <UserName> 820 indicates the login name of the user who has caused the event. A tag <Device> 830 indicates the host name in TCP/IP of the device to which the job is to be transmitted. A tag <JobStatus> 840 takes a value such as BeforeJob or AfterJob representing the type of notification contents. In the example shown in FIG. 8B, the tag <JobStatus> 840 indicates before and after the start of processing by the job.

(Processing by Application 109)

Figure 9A:
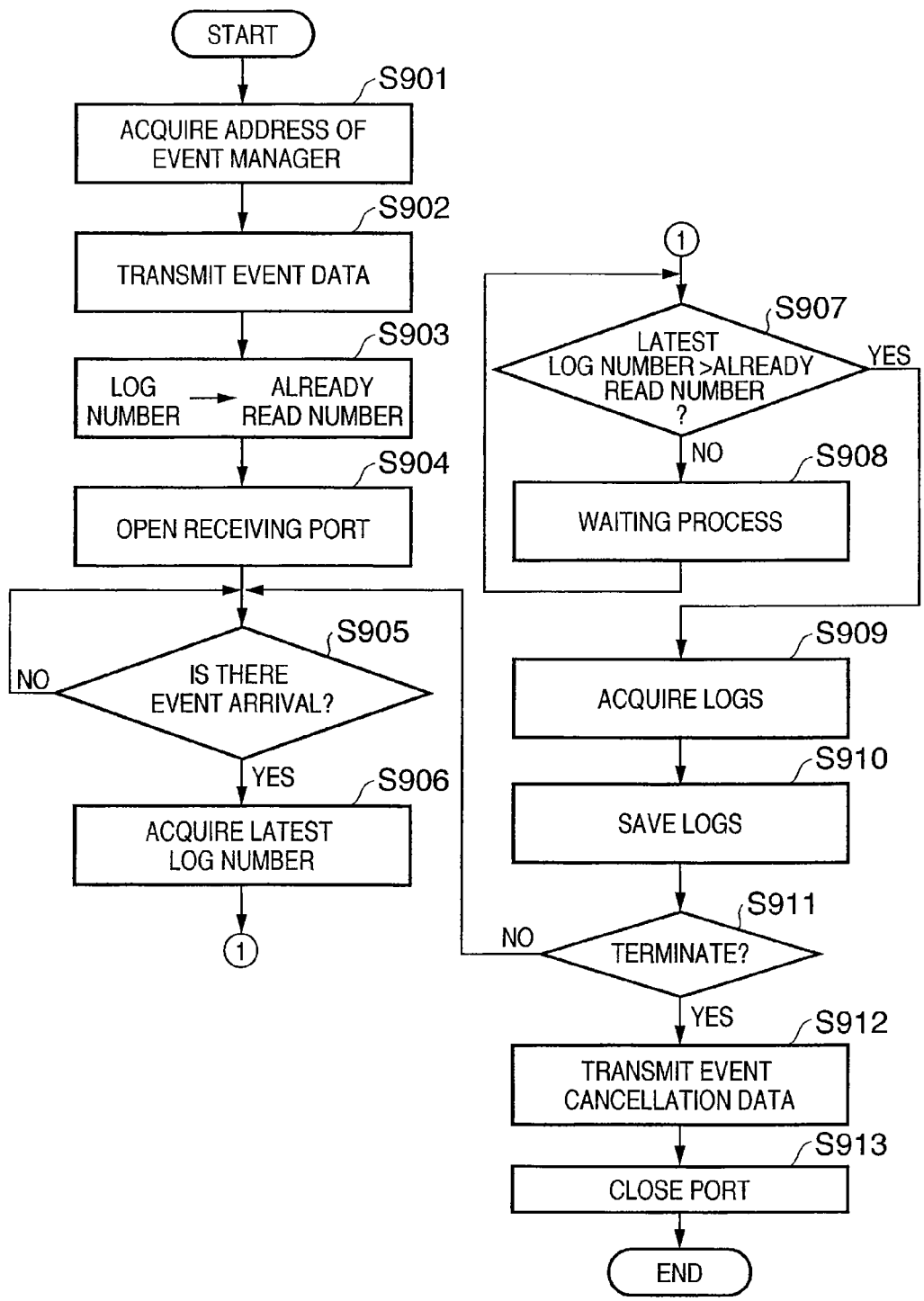
FIG. 9A is a flowchart explaining the procedure of processing by an application 109 according to the first embodiment of the present invention.

The procedure of processing by the application 109 installed in the server computer 108 will be explained below with reference to a flowchart shown in FIG. 9A. FIG. 9A takes an application which acquires job logs as an example. It is possible by storing the acquired job logs in an HDD or database to implement a job account function which obtains the printing amount of each user or displays a list of printed document names for each unit period.

In step S901, the application 109 acquires the address of the event manager 107 (FIGS. 1 and 14) which mediates a job transmission event to a device as an object of status acquisition by the application 109. This address acquisition acquires the addresses (pairs of IP addresses and port numbers) of a plurality of event managers set via a UI shown in FIG. 10 (to be described later). The application 109 transmits event data to the acquired addresses in step S902 (to be explained later). Although the address is determined by a communication protocol, it is assumed that communication is performed by a unique protocol on TCP/IP. The user can set the address of the event manager 107 by using a setting application.

Figure 10:
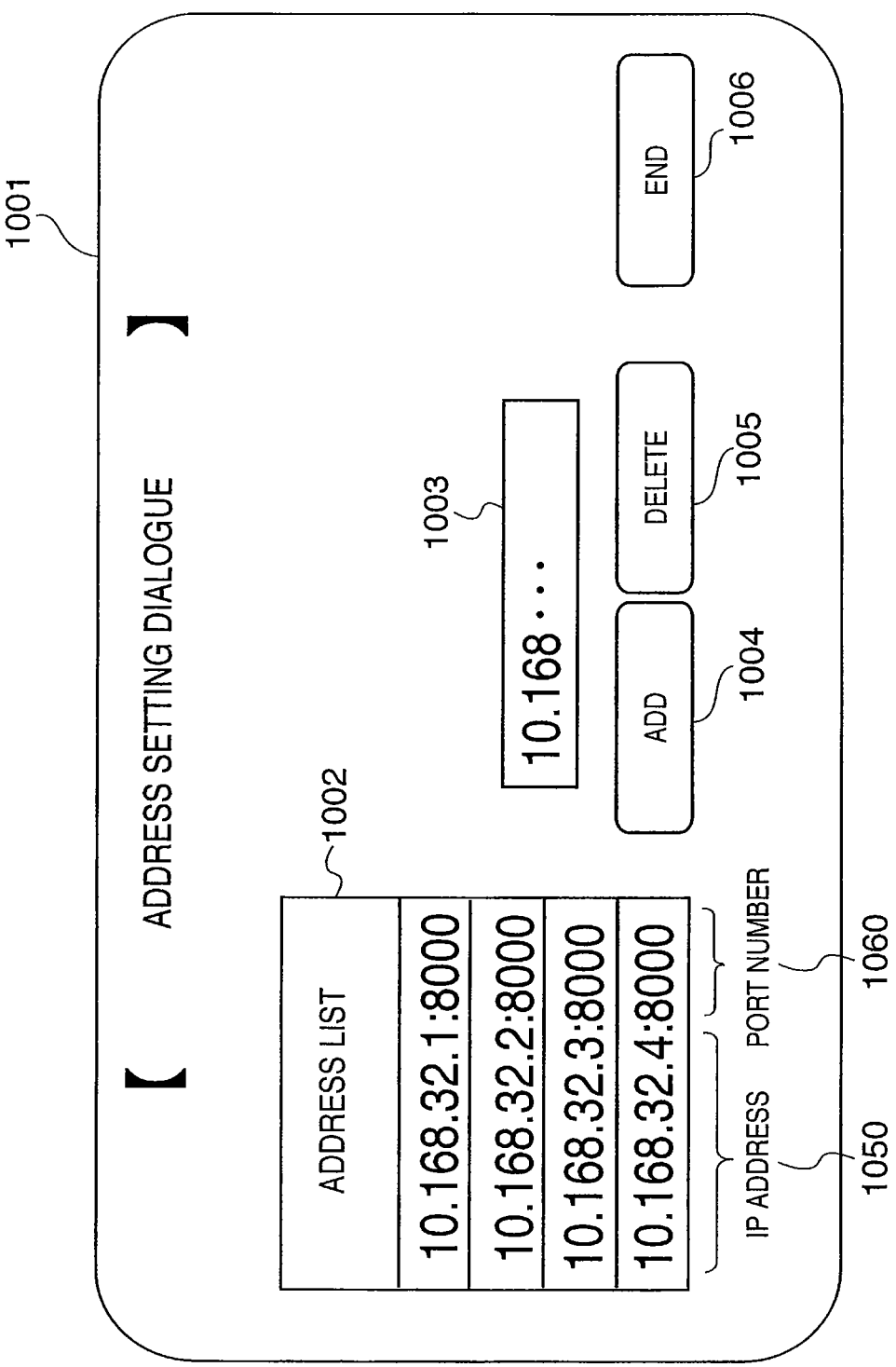
FIG. 10 is a view showing an example of an address setting dialogue.

FIG. 10 is a view showing an example of an address setting dialogue 1001. The address is information indicating the location of an event manager. The address setting dialogue 1001 displays an address list 1002, address input space 1003, addition button 1004, delete button 1005, and end button 1006. The user can input an address made up of an IP address 1050 and port number 1060 from the address input space 1003. The user can add the input address to the address list 1002 by designating the addition button 1004, and delete the registered address by designating the delete button 1005. The display of the address setting dialogue ends when the user designates the end button 1006.

The explanation will return to FIG. 9A. In step S902, the application 109 establishes a connection by TCP/IP to the address or addresses of one or a plurality of event managers acquired in step S901, and transmits data indicating an event notification request to the event managers. The notified event notification destinations are the notification destinations in FIG. 8A explained earlier, and each of a plurality of applications 109 executes the process in step S902. Consequently, a plurality of notification destinations are extracted in the loop of steps S801 to S803 in FIG. 8A.

FIG. 9B shows an example of the data indicating an event notification request. A tag <ComputerName> 915 indicates the host name in TCP/IP of a computer which requests event notification. A tag <Address> 916 indicates the address of the server 108 which receives the event. A tag <UserName> 917 indicates the login name of a user who requests event notification. A tag <JobStatus> 918 indicates a state in which the job generates an event. The tag <JobStatus> 918 takes BeforeJob or AfterJob as a value. BeforeJob represents before the start of processing by the job, and AfterJob represents after the start of the processing.

FIG. 9C shows an example of the main portion of response data from the event manager. <SubscribedID> 920 takes an integral value. If this value is a positive number, the value means "success", and an event notification request can be uniquely specified by the value. When terminating the processing, the application cancels the event notification request by this numerical value. Note that tags such as <Address> are omitted from FIG. 9C and each data example (to be described later). In practice, however, data necessary to perform communication between two parties is contained as in the data explained above with reference to FIG. 9B.

If <SubscribedID> 920 is a negative number, the event notification request is unsuccessful.

In step S903, the application 109 connects to the device A 110 in the case shown in, e.g., FIG. 1, and acquires latest job log information (a latest log number) of a newest job log. This latest log number is regarded as an already read log number. This communication between the application 109 and device will be described later.

In step S904, the application 109 opens by using, as a receiving port, the address transmitted as an event notification request to the event manager 107 in step S902. After that, data reception is possible. That is, steps S901 to S904 configure pre-processing for acquiring every job log. A waiting process and processing using an event as a trigger will be explained below.

Assume that a predetermined time has elapsed after that, and the device A 110 has proceeded from the state (normal operation mode) in which a normal operation is possible to the power-saving state (sleep mode). A plurality of states are possible as the power-saving state of the device. An example is a state in which the power supply to the printer engine is suppressed. In this state, the printer controller and network interface (NIC) are operating in a normal operation enable state. Another example is a super-power-saving state in which the normal communication function of the printer controller and network interface (NIC) is stopped. The normal communication function is a function capable of exchanging data concerning PDL, various status requests, and the like. Even when the normal communication function is partially stopped, the network interface (NIC) can exchange specific pattern data such as an ARP (Address Resolution Protocol) packet.

In any power-saving state, external access causes power-saving return, and this power-saving return is desirably restrained. This embodiment will explain the power-saving state by taking the super-power-saving state described above as an example.

In step S905, the application 109 determines whether event occurrence notification has arrived. If event occurrence notification has arrived (YES in S905), the application 109 advances the process to step S906. Note that in practice, the application 109 checks the contents (type) of the event occurrence notification, and determines whether to advance the process to step S906 on the basis of the check result. More specifically, the application 109 identifies the contents of notification shown in FIG. 8B, and determines whether event occurrence notification has arrived.

On the other hand, if it is determined in step S905 that no event occurrence notification has arrived (NO in S905), the application 109 waits in an event occurrence notification arrival waiting state (S905).

If event occurrence notification has arrived (YES in S905), the application 109 having received this event occurrence notification can start accessing the device A 110 (i.e., can start application processing which acquires a latest log number).

In step S906, the application 109 connects to the device A 110 on the basis of the contents of notification shown in FIG. 8B, and acquires a latest log number from the device A 110. This communication with the device will be described later.

If it is determined in step S905 that event occurrence notification has arrived, the application 109 can immediately start communicating with the device A110 in step S906. However, this communication may fail if the device A 110 has not completely proceeded from the sleep mode to the normal operation mode at this timing. Although retry is normally performed in this case, the application 109 can also delay the start timing of the communication process by inserting a predetermined waiting time between steps S905 and S906. This can also prevent the start of communication when the device A 110 is in the sleep mode.

In step S907, the application 109 compares the latest log number with the already read log number. If the latest log number is larger than the already read number (YES in S907), the application 109 advances the process to step S909; if not (NO in S907), the application 109 advances the process to step S908.

In step S908, the application 109 waits for only a prescribed time (e.g., 20 sec) (a waiting process). The purpose of this waiting process for the prescribed time is to prevent excess communication with the device A 110, and the prescribed time is variable.

In step S909, the application 109 communicates with the device and acquires job logs from (already read log number+1) to the latest log number. This communication with the device A 110 will be described later.

In step S910, the application 109 saves the acquired job logs in the external storage device 206.

In step S911, the application 109 determines whether a termination request has come to the application 109. If a termination request has come (YES in S911), the application 109 advances the process to step S912, and transmits data indicating cancellation of the event notification request to the event manager 107. FIG. 9D is a view showing the main part of the event notification request cancellation data. On the other hand, if it is determined in step S911 that no termination request has come (NO in S911), the application 109 returns the process to step S905, and waits for the arrival of event occurrence notification indicating specific contents (type).

In step S913, the application 109 closes the event receiving port opened in step S904, and terminates the process.

(Communication with Device)

The above-mentioned communication between the device A 110 (or device B 111) and application 109 will be explained below. SNMP is conventionally proposed as a communication protocol for network devices, so this SNMP can be used. However, communication may also be performed by the XML format as indicated by an example of data shown in FIG. 9E. FIG. 9E is a view showing an example of request data for acquiring a latest log number. This data is transmitted and received by TCP/IP. FIG. 9F is a view showing an example of data returned from the device. A tag <LatestJobLogNumber> 925 indicates that a latest log number is "30".

FIG. 9G shows an example of request data by which the application 109 acquires log data. A tag <From> 930 and tag <To> 935 indicate that this data requests the acquisition of job log data whose log number is 21 (inclusive) to 22 (exclusive). FIG. 9H is a view showing an example of data returned by the device A 110 in response to the log data acquisition request. A tag <Number> 940 indicates that the log number of the data to be returned is 21. A tag <DocumentName> 945 indicates that the document name is "StatusReport.txt". A tag <JobType> 950 indicates that the job type is PDL printing. A tag <UserName> 955 indicates that the user name is "Tanaka".

Note that the data returned from the device A 110 is not limited to the example shown in FIG. 9H. For example, it is also possible to return "the number of logical pages", "the number of sheets", "the number of pages allocated per side of sheet", "double-sided or single-sided", "start time", "end time", and the like shown in FIG. 11 in accordance with the status of execution of the job in the device A 110.

As has been explained above, when an application acquires log information of a device, this embodiment can suppress the power consumption of the device by a simple user-friendly process.

Second Embodiment

The second embodiment of the present invention will be explained below with reference to FIGS. 12, 13A-1, 13A-2, 13B, and 13C. The system configuration is the same as the first embodiment except that an application 109 is "a job status monitor application" which monitors the status of a job executed on a device.

FIG. 12 is a view showing a dialogue 1201 displayed on a CRT 210 under the control of a CRT controller 205, and indicating the status of a job executed by, e.g., a device A 110. The dialogue 1201 contains a list display 1202 showing a list of jobs currently being executed by the device A 110 as an object. The job list display 1202 includes information indicating a job name 1204, a user name 1205, and a processing status 1206 of a job in the device A 110. When an end button 1203 is designated, the job status display dialogue 1201 is closed.

Figures 1, 13A:
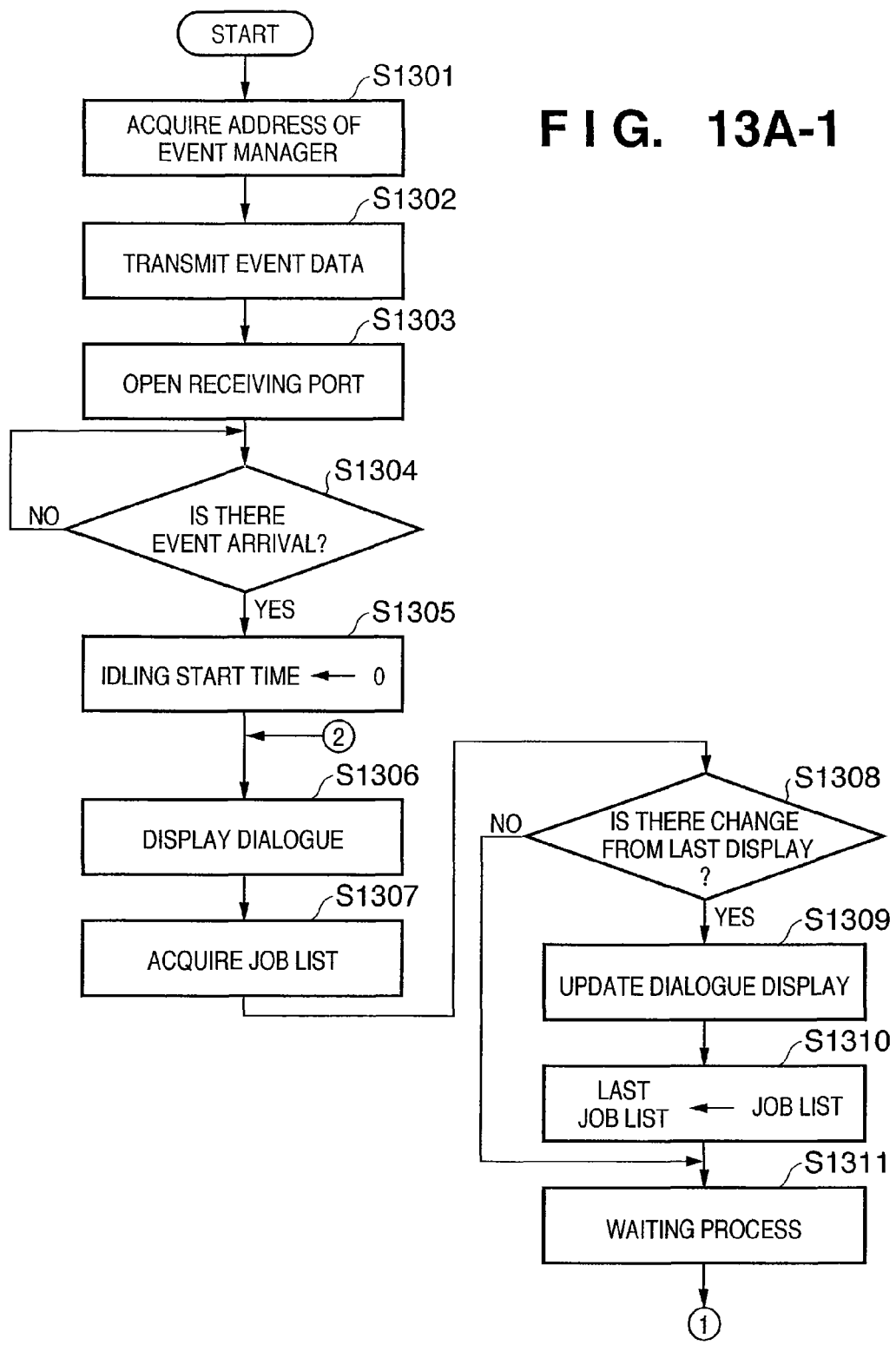
Figures 2, 13A:
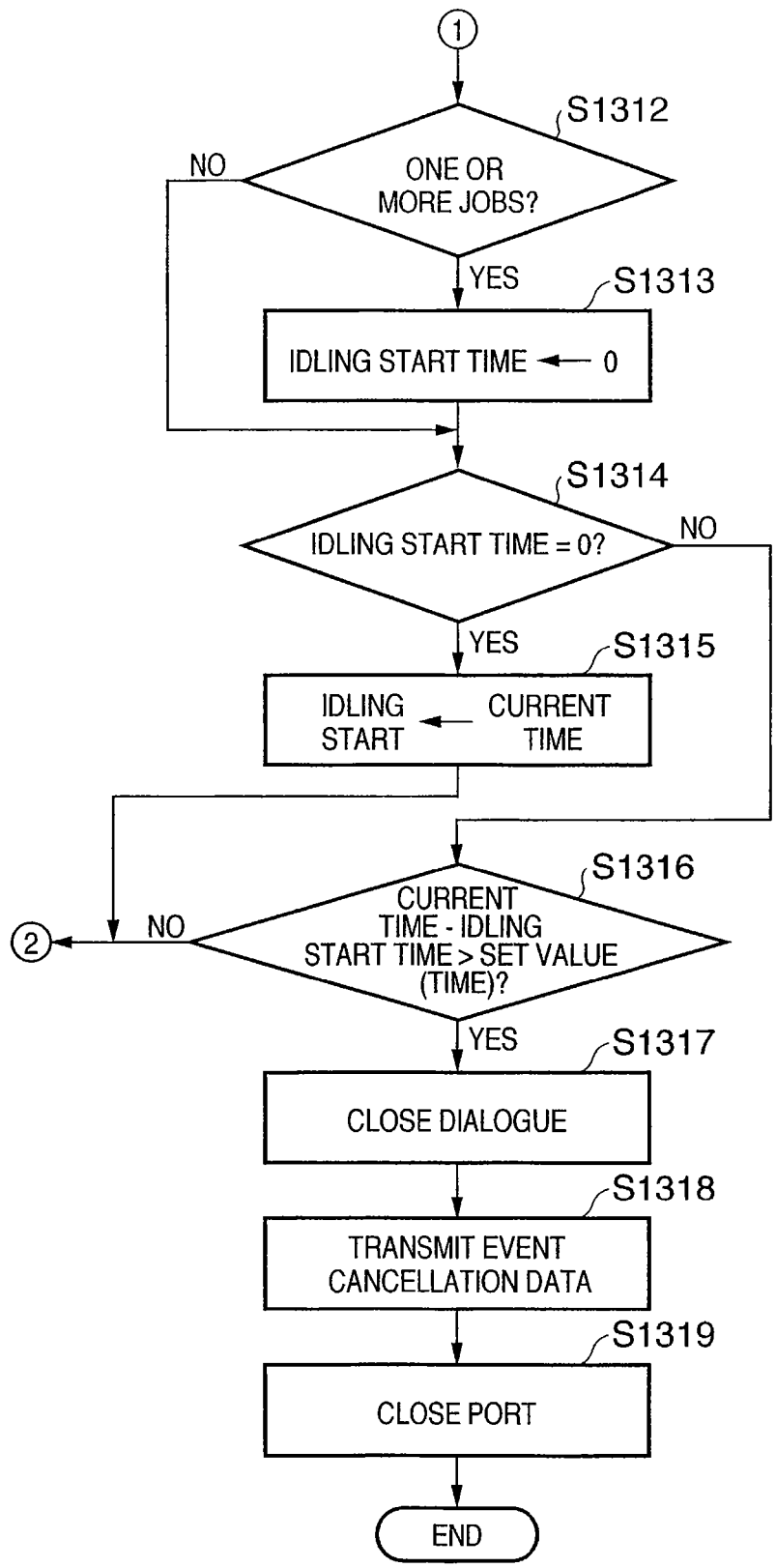

The procedure of processing by the application 109 according to the second embodiment of the present invention will be explained below with reference to a flowchart shown in FIG. 13A-1 and FIG. 13A-2.

In step S1301, the application 109 acquires the address of an event manager 107 (FIGS. 1 and 14). The contents of this process are the same as in step S901 described above.

In step S1302, the application 109 establishes a connection by TCP/IP to the address of the event managers acquired in step S1301, and transmits data indicating an event notification request to the event managers. The contents of this process are the same as in step S902 described above.

In step S1303, the application 109 opens by using, as a receiving port, the address of the event manager 107 to which the data indicating an event notification request is transmitted in step S1302. After that, data reception is possible.

Assume that a predetermined time has elapsed after that, and the device A 110 has proceeded from the state (normal operation mode) in which a normal operation is possible to the power-saving state (sleep mode).

In step S1304, the application 109 determines whether event occurrence notification having specific contents as explained by the tag <JobStatus> shown in FIG. 9B has arrived. If event occurrence notification having specific contents has arrived (YES in S1304), the application 109 advances the process to step S1305. If it is determined in step S1304 that no event occurrence notification has arrived (NO in S1304), the application 109 waits in an event occurrence notification arrival waiting state (S1304).

If event occurrence notification has arrived (YES in S1304), the application 109 having received this event occurrence notification can start accessing the device A 110 (i.e., can start a process of monitoring the status of the device A 110).

In step S1305, the application 109 generates a variable called idling start time, and initializes the variable to "0". If this variable is 0, this indicates that a device to be monitored is in an idling state. If the variable indicates time, this time is the first time at which the application 109 senses the idling state of the device.

In step S1306, the application 109 displays the job status display dialogue 1201 shown in FIG. 12 on the CRT 210 under the control of the CRT controller 205. In this state, the job list 1202 is empty.

In step S1307, the application 109 communicates with the device A 110 to acquire a job list. This job list is a list of jobs which have been started to be executed on the device A 110 but have not been terminated yet. This communication between the device A 110 and application 109 is the same as the procedure (step S906 in FIG. 9A) of acquiring a latest log number explained in the first embodiment, so a detailed explanation thereof will be omitted.

FIG. 13B shows an example of request data for acquiring a job list. Referring to FIG. 13B, a tag <JobStatus> 1320 indicates the status of a job which requests a response. Note that tags such as <Address> are omitted from FIGS. 13B and 13C, but data necessary to perform communication between two parties is contained in practice as explained previously with reference to FIG. 9B. Possible job statuses are, e.g., waiting/executing/error/completion/all, and "ALL" indicating "all" is designated in FIG. 13B. A tag <JobType> 1330 indicates the type of the job which requests a response. Possible job types are, e.g., PDL/copy/FAX transmission/save job/all, and "ALL" indicating "all" is designated in FIG. 13B.

FIG. 13C shows an example of data returned by the device A 110 in response to the request shown in FIG. 13B. This data to be returned contains data pertaining to job 1 1335, job 2 1340, and job 3 1345 which have been started to be executed but have not been finished yet in the device A 110. In the case of job 1 1335, a tag <Number> 940 indicates that the log number of the data to be returned is 21, a tag <DocumentName> 1336 indicates that the document name is "StatusReport.txt", a tag <UserName> 1337 indicates that the user name is "Tanaka", and a tab <Status> 1338 indicates that there is no sheet. For job 2 1340 and job 3 1345, data describing the contents of these jobs are similarly returned (in FIG. 13C, the details of job 2 1340 and job 3 1345 are omitted).

The explanation will return to FIG. 13A-1. In step S1308, the application 109 determines whether the contents of the job list acquired in step S1307 have changed from those of the last job list. If the job list has changed (YES in S1308), the application 109 advances the process to step S1309. If the job list has not changed (NO in S1308), the application 109 advances the process to step S1311. Assume that the last job list is saved in step S1310 (to be described later).

In step S1309, the CRT controller 205 updates the job list 1202 on the basis of the job list acquired in step S1307.

In step S1310, the application 109 stores the job list acquired in step S1307 as the last job list in an external storage device 206.

In step S1311, the application 109 waits for only a predetermined prescribed time (e.g., 20 sec) (a waiting process). This process prevents the process in step S1307 from becoming excessive. The purpose of the waiting process for the prescribed time is to prevent excess communication with the device A 110, and the prescribed time is variable.

In step S1312, the application 109 determines whether the number of jobs in the job list acquired in step S1307 is one or more. If the number of jobs is one or more (YES in S1312), the application 109 advances the process to step S1313. In step S1313, the application clears the idling start time to 0.

On the other hand, if it is determined in step S1312 that the number of jobs is not one or more, i.e., is 0 (NO in S1312), the application 109 advances the process to step S1314. In step S1314, the application 109 determines whether the idling start time is 0. If the idling start time is 0 (YES in S1314), the application 109 advances the process to step S1315. In step S1315, the application 109 determines that idling has started, sets the current time as the idling start time, and returns the process to step S1307. From step S1307, the application 109 similarly executes the processing from the job list acquisition process.

On the other hand, if it is determined in step S1314 that the idling start time is not 0 but the time data has already been set (NO in S1314), the application 109 advances the process to step S1316. In step S1316, if the idling state of the device A 110 has continued from the last access, the application 109 calculates the time elapsed from the idling start time to the current time. If the calculated elapsed time is longer than a preset value (time) (YES in S1316), the application 109 advances the process to step S1317.

If it is determined in step S1316 that the time elapsed from the idling start time to the current time is shorter than the preset value (time) (NO in S1316), the application 109 returns the process to step S1307, and continuously executes the processing from the job list acquisition process.

In step S1317, the CRT controller 205 stops displaying the job status display dialogue 1201 displayed in step S1306 and updated in step S1309.

In step S1318, the application 109 transmits data (FIG. 9D) indicating cancellation of the event notification request to the event manager 107.

In step S1319, the application 109 closes the event receiving port opened in step S1303, and terminates the process.

As has been explained above, when an application performs a process of monitoring the status of a device, this embodiment can suppress the power consumption of the device by a simple user-friendly process.

Third Embodiment

In the first embodiment, the address of the event manager 107 is set by the address setting dialogue 1001 shown in FIG. 10. However, the location (address) of the event manager 107 can also be obtained by search provided by Web service. In this case, an application (a printer driver 104 in the case of FIG. 1) which performs print job transmission or the like registers in UDDI that (1) the application causes a device to proceed from the sleep mode to the normal mode, and (2) the application notifies the occurrence of an event before the procession.

UDDI is an abbreviation for Universal Description, Discovery and Integration. UDDI is a search/collation system of Web service using the XML and existing on the Internet.

From UDDI, an application 109 which acquires a job log or device status monitoring information causes a device to proceed from the sleep mode to the normal mode from UDDI. The application 109 can also search for an application (e.g., the printer driver 104) which notifies the occurrence of an event, and issues an event notification request to the found application.

Since the application such as the printer driver 104 as the event notification request destination is specified by UDDI search, it is unnecessary to manually set the address of the event manager 107 as shown in FIG. 10. This further improves the user-friendliness.

Fourth Embodiment

The above third embodiment has explained the unit adapted to search for an access unit such as a printer driver which belongs to the first category by taking UDDI as an example. However, the search unit is not limited to UDDI. For example, it is also possible to newly define an MIB, and construct a search unit adapted to search for an access unit such as a printer driver which belongs to the first category by using the newly defined MIB.

Other Embodiments

Note that it is of course also possible to achieve the object of the present invention by supplying, to a system or apparatus, a storage medium recording the program code of software for implementing the functions of the embodiments described above. The object of the present invention can also be achieved by a computer (or a CPU or MPU) of the system or apparatus by reading out and executing the program code stored in the storage medium.

In this case, the program code itself read out from the storage medium implements the functions of the above embodiments, and the storage medium storing this program code constitutes the present invention.

As the storage medium for supplying the program code, it is possible to use, e.g., a flexible disk, hard disk, optical disk, magnetooptical disk, CD-ROM, CD-R, nonvolatile memory card, or ROM.

Also, the functions of the above embodiments are implemented by the computer by executing the readout program code. Furthermore, the present invention naturally includes a case where an OS (Operating System) or the like running on the computer performs part or the whole of actual processing on the basis of instructions by the program code, thereby implementing the above-mentioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-069899, filed Mar. 14, 2006, which is hereby incorporated by reference herein in its entirety.

What is claimed is:

1. An information processing system capable of communicating via a network with a printing apparatus which returns from power saving by external access, the information processing system comprising:
 a printer driver program unit installed in a first information processing apparatus and adapted to send print data to said printing apparatus;
 an application program unit installed in a second information processing apparatus communicating with the first information apparatus via the network and adapted to access said printing apparatus and acquire information from said printing apparatus; and
 an event managing unit adapted to manage a plurality of notification destinations of notification of an event occurrence,
 wherein the application program unit comprises:
 a requesting unit adapted to request notification of event occurrence generated by processing by said printer driver program unit to said event managing unit, wherein the event occurrence is defined as sending the print data from said printer driver program unit to said printing apparatus; and
 a determination unit adapted to determine presence or absence of the notification of the event occurrence by said printer driver program unit, wherein said application program unit accesses said printing apparatus and acquires information from said printing apparatus, in the case when said determination unit determines that there is the notification of the event occurrence, and wherein said application program unit does not access said printing apparatus, in the case when said determination unit determines that there is not a notification of the event occurrence.

2. The system according to claim 1, wherein said event managing unit notifies said printer driver program unit of a notification destination of the notification of the event occurrence on the basis of the request by said requesting unit, said printer driver program unit notifying the notification destination notified by said event managing unit of the event occurrence.

3. The system according to claim 1, wherein said event managing unit notifies a request source of the request of the event occurrence in response to reception of the notification of the event occurrence from said printer driver program unit.

4. The system according to claim 3, wherein if said event managing unit has received requests for distributing the notification of the event occurrence from a plurality of request sources, said event managing unit distributes the notification of the event occurrence to said plurality of request sources in response to the notification from said printer driver program unit.

5. The system according to claim 1, wherein said determination unit determines a type of the notification, and said application program unit accesses said printing apparatus, on the basis of the determination by said determination unit.

6. The system according to claim 1, further comprising a search unit adapted to search for said printer driver program unit,
wherein said requesting unit requests said printer driver program unit found by said search unit to notify the event occurrence.

7. An information processing method in an information processing system capable of communicating via a network with a printing apparatus which returns from power saving by external access, and having a printer driver program unit installed in a first information processing apparatus and adapted to send print data to the printing apparatus and an application program unit installed in a second information processing apparatus communicating with the first information apparatus via the network and adapted to access the printing apparatus and acquire information from the printing apparatus and an event managing unit,
wherein the information processing method executed by the event managing unit comprising:
an event managing step of managing a plurality of notification destinations of notification of an event occurrence, and
wherein an application program executed by the application program unit performs the information processing method comprising:
a requesting step of requesting notification of event occurrence generated by processing by a printer driver program executed by the printer driver program unit to said event managing unit, wherein the event occurrence is defined as sending the print data from said printer driver program unit to said printing apparatus; and
a determination step of determining presence or absence of the notification of the event occurrence by the printer driver program,
wherein the application program executed by the application program unit accesses the printing apparatus and acquires information from the printing apparatus, in the case when it is determined in the determination step that there is the notification of the event occurrence, and
wherein the application program executed by the application program unit does not access said printing apparatus, in the case when it is determined in the determination step that there is not a notification of the event occurrence.

8. The method according to claim 7, wherein the event managing step notifies the printer driver program unit of a notification destination of the notification of the event occurrence on the basis of the request in the requesting step,
the printer driver program unit notifying the notification destination notified in the event managing step of the event occurrence.

9. The method according to claim 7, wherein the event managing step of notifies a request source of the request of the event occurrence in response to reception of the notification of the event occurrence from the printer driver program unit.

10. The method according to claim 9, wherein if requests for distributing the notification of the event occurrence are received from a plurality of request sources in the event managing step, the notification of the event occurrence is distributed to the plurality of request sources in response to the notification from the printer driver program unit in the event managing step.

11. The method according to claim 7, wherein a type of the notification is determined in the determination step, and the application program accesses the printing apparatus on the basis of the determination in the determination step.

12. The method according to claim 7, further comprising a search step of searching for the printer driver program unit,
wherein in the requesting step, the printer driver program unit found in the search step is requested to notify the event occurrence.

13. A non-transitory computer-readable medium storing a computer program that causes a computer to execute an information processing method in an information processing system capable of communicating via a network with a printing apparatus which returns from power saving by external access, and having a printer driver program unit installed in a first information processing apparatus and adapted to send print data to the printing apparatus and an application program unit installed in a second information processing apparatus communicating with the first information apparatus via the network and adapted to access the printing apparatus and acquire information from the printing apparatus and an event managing unit, the information processing method comprising:
an event managing step of managing a plurality of notification destinations of notification of an event occurrence;
a requesting step of requesting notification of event occurrence generated by processing by a printer driver program executed by the a printer driver program unit, wherein the event occurrence is defined as sending the print data from said printer driver program unit to said printing apparatus; and
a determination step of determining presence or absence of the notification of the event occurrence by the printer driver program,
wherein the application program executed by the application program unit accesses the printing apparatus and acquires information from the printing apparatus, in the case when it is determined in the determination step that there is the notification of the event occurrence, and
wherein the application program executed by the application program unit does not access said printing apparatus, in the case when it is determined in the determination step that there is not a notification of the event occurrence.

14. The non-transitory computer-readable medium according to claim 13 being a storage medium.

* * * * *